United States Patent
Korzh et al.

(10) Patent No.: US 11,614,894 B2
(45) Date of Patent: *Mar. 28, 2023

(54) HIERARCHICAL MEMORY SYSTEMS

(71) Applicant: Micron Technology, Inc., Boise, ID (US)

(72) Inventors: Anton Korzh, Santa Clara, CA (US); Vijay S. Ramesh, Boise, ID (US); Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/307,873

(22) Filed: May 4, 2021

(65) Prior Publication Data
US 2021/0255807 A1 Aug. 19, 2021

Related U.S. Application Data

(63) Continuation of application No. 16/547,837, filed on Aug. 22, 2019, now Pat. No. 11,036,434.

(51) Int. Cl.
G06F 3/00 (2006.01)
G06F 3/06 (2006.01)
(Continued)

(52) U.S. Cl.
CPC .......... *G06F 3/0659* (2013.01); *G06F 3/0656* (2013.01); *G06F 3/0679* (2013.01);
(Continued)

(58) Field of Classification Search
None
See application file for complete search history.

(56) References Cited

U.S. PATENT DOCUMENTS 5,339,394 A   8/1994   Johnson et al.
8,286,162 B2  10/2012  Neiger et al.
(Continued)

OTHER PUBLICATIONS www.wikipedia.com, Volatile memory, Dec. 16, 2017, p. 1 (Year: 2017).*

(Continued)

*Primary Examiner* — Henry Tsai
*Assistant Examiner* — Dean Phan
(74) *Attorney, Agent, or Firm* — Brooks, Cameron & Huebsch, PLLC

(57) ABSTRACT

Apparatuses, systems, and methods for hierarchical memory systems are described. A hierarchical memory system can leverage persistent memory to store data that is generally stored in a non-persistent memory, thereby increasing an amount of storage space allocated to a computing system at a lower cost than approaches that rely solely on non-persistent memory. In an example apparatus, an input/output (I/O) device can receive signaling that includes a command to write to or read data from an address corresponding to a non-persistent memory device, and can determine where to redirect the request. For example, the I/O device can determine to write or read data to and/or from the non-persistent memory device or the persistent memory device based at least in part on one or more characteristics of the data.

19 Claims, 6 Drawing Sheets

(51) Int. Cl.
  *G06F 13/38* (2006.01)
  *G06F 9/455* (2018.01)
  *G06F 9/30* (2018.01)

(52) U.S. Cl.
  CPC ...... *G06F 9/30098* (2013.01); *G06F 9/45558* (2013.01); *G06F 13/385* (2013.01); *G06F 3/0611* (2013.01); *G06F 2213/0026* (2013.01)

(56) References Cited

U.S. PATENT DOCUMENTS

| | | | |
|---|---|---|---|
| 9,032,181 B2 | 5/2015 | Ahmad et al. | |
| 10,732,847 B2* | 8/2020 | Bazarsky | G06F 11/1048 |
| 2002/0065990 A1* | 5/2002 | Chauvel | G06F 12/0879 |
| | | | 711/3 |
| 2007/0255891 A1* | 11/2007 | Chow | G06F 13/161 |
| | | | 711/103 |
| 2007/0288692 A1 | 12/2007 | Bruce et al. | |
| 2007/0300038 A1 | 12/2007 | Frederick | |
| 2011/0167422 A1 | 7/2011 | Eom et al. | |
| 2013/0174148 A1 | 7/2013 | Nadav et al. | |
| 2013/0179646 A1* | 7/2013 | Okubo | G06F 12/00 |
| | | | 711/154 |
| 2014/0122783 A1 | 5/2014 | Oh et al. | |
| 2015/0052290 A1 | 2/2015 | Um et al. | |
| 2015/0227313 A1 | 8/2015 | Lee et al. | |
| 2016/0188452 A1 | 6/2016 | Almasi et al. | |
| 2016/0239431 A1 | 8/2016 | Li et al. | |
| 2017/0220592 A1 | 8/2017 | Foltz | |
| 2018/0165208 A1 | 6/2018 | Farey | |
| 2019/0116132 A1* | 4/2019 | Suzuki | H04L 45/08 |

OTHER PUBLICATIONS

International Search Report and Written Opinion from related PCT Application No. PCT/US2020/046350, dated Nov. 20, 2020, 15 pages.

www.wikipedia.com, Volatile Memory, Dec. 2017, p. 1. (Year: 2017).

* cited by examiner

HIERARCHICAL MEMORY SYSTEMS

PRIORITY INFORMATION

This application is a Continuation of U.S. application Ser. No. 16/547,837, filed on Aug. 22, 2019, the contents of which are incorporated herein by reference.

TECHNICAL FIELD

The present disclosure relates generally to semiconductor memory and methods, and more particularly, to apparatuses, systems, and methods related to hierarchical memory systems

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
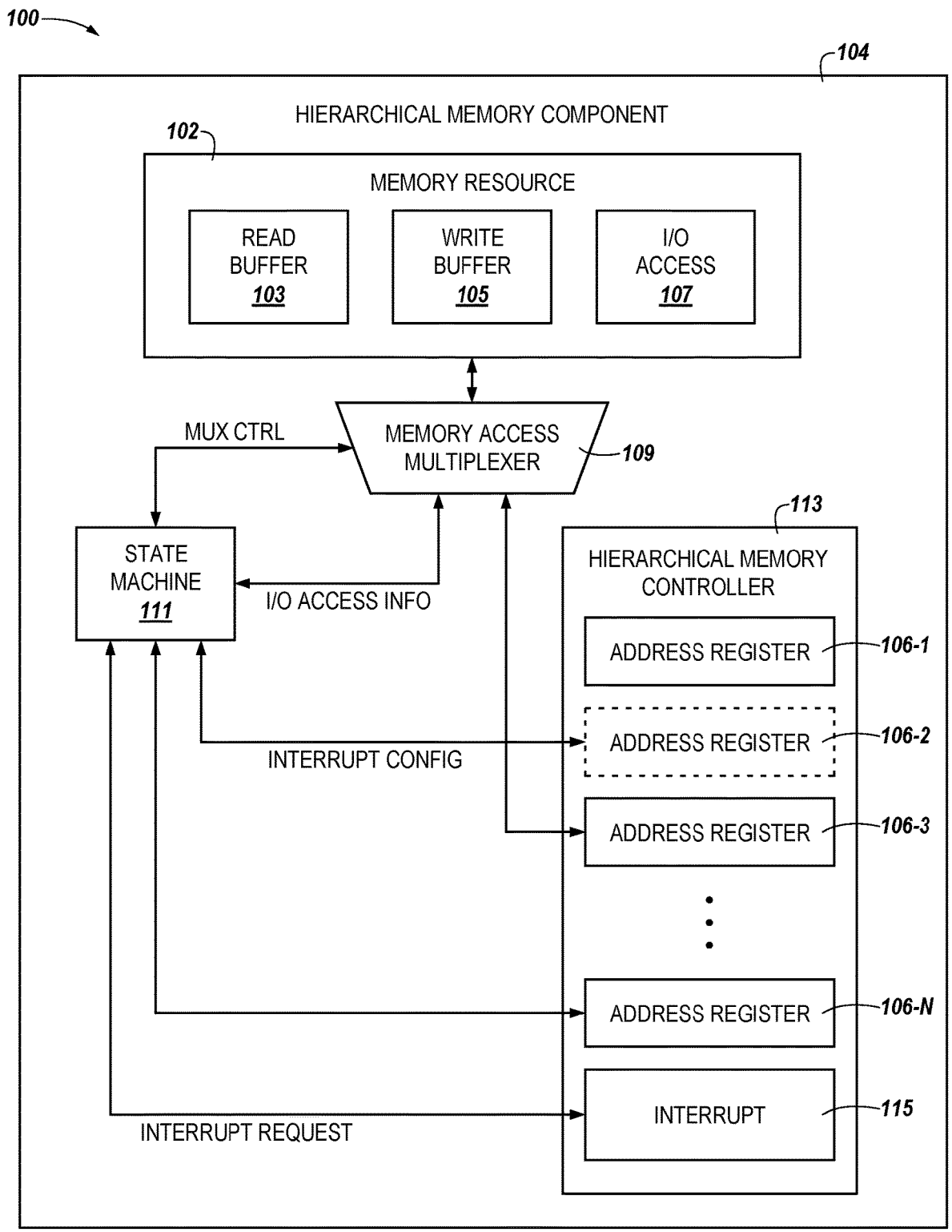
FIG. 1 is a functional block diagram in the form of an apparatus including logic circuitry in accordance with a number of embodiments of the present disclosure.

Apparatuses, systems, and methods for hierarchical memory systems are described. A hierarchical memory system can leverage persistent memory to store data that is generally stored in a non-persistent memory, thereby increasing an amount of storage space allocated to a computing system at a lower cost than approaches that rely solely on non-persistent memory. In an example apparatus, an input/output (I/O) device can receive signaling that includes a command to write to or read data from an address corresponding to a non-persistent memory device, and can determine where to redirect the request. For example, the I/O device can determine to write or read data to and/or from the non-persistent memory device or the persistent memory device based at least in part on one or more characteristics of the data.

Computing systems utilize various types of memory resources during operation. For example, a computing system may utilize a combination of volatile (e.g., random-access memory) memory resources and non-volatile (e.g., storage) memory resources during operation. In general, volatile memory resources can operate at much faster speeds than non-volatile memory resources and can have longer lifespans than non-volatile memory resources; however, volatile memory resources are typically more expensive than non-volatile memory resources. As used herein, a volatile memory resource may be referred to in the alternative as a "non-persistent memory device" while a non-volatile memory resource may be referred to in the alternative as a "persistent memory device."

However, a persistent memory device can more broadly refer to the ability to access data in a persistent manner. As an example, in the persistent memory context, the memory device can store a plurality of logical to physical mapping or translation data and/or lookup tables in a memory array in order to track the location of data in the memory device, separate from whether the memory is non-volatile. Further, a persistent memory device can refer to both the non-volatility of the memory in addition to using that non-volatility by including the ability to service commands for successive processes (e.g., by using logical to physical mapping, look-up tables, etc.).

These characteristics can necessitate trade-offs in computing systems in order to provision a computing system with adequate resources to function in accordance with ever-increasing demands of consumers and computing resource providers. For example, in a multi-user computing network (e.g., a cloud-based computing system deployment, a software defined data center, etc.), a relatively large quantity of volatile memory may be provided to provision virtual machines running in the multi-user network. However, by relying on volatile memory to provide the memory resources to the multi-user network, as is common in some approaches, costs associated with provisioning the network with memory resources may increase, especially as users of the network demand larger and larger pools of computing resources to be made available.

Further, in approaches that rely on volatile memory to provide the memory resources to provision virtual machines in a multi-user network, once the volatile memory resources are exhausted (e.g., once the volatile memory resources are allocated to users of the multi-user network), additional users may not be added to the multi-user network until additional volatile memory resources are available or added. This can lead to potential users being turned away, which can result in a loss of revenue that could be generated if additional memory resources were available to the multi-user network.

Volatile memory resources, such as dynamic random-access memory (DRAM) tend to operate in a deterministic manner while non-volatile memory resources, such as storage class memories (e.g., NAND flash memory devices, solid-state drives, resistance variable memory devices, etc.) tend to operate in a non-deterministic manner. For example, due to error correction operations, encryption operations, RAID operations, etc. that are performed on data retrieved from storage class memory devices, an amount of time between requesting data from a storage class memory device and the data being available can vary from read to read, thereby making data retrieval from the storage class memory device non-deterministic. In contrast, an amount of time between requesting data from a DRAM device and the data being available can remain fixed from read to read, thereby making data retrieval from a DRAM device deterministic.

In addition, because of the distinction between the deterministic behavior of volatile memory resources and the non-deterministic behavior of non-volatile memory resources, data that is transferred to and from the memory resources generally traverses a particular interface (e.g., a bus) that is associated with the type of memory being used. For example, data that is transferred to and from a DRAM device is typically passed via a double data rate (DDR) bus, while data that is transferred to and from a NAND device is typically passed via a peripheral component interconnect express (PCI-e) bus. As will be appreciated, examples of interfaces over which data can be transferred to and from a volatile memory resource and a non-volatile memory resource are not limited to these specific enumerated examples, however.

Because of the different behaviors of non-volatile memory device and volatile memory devices, some approaches opt to store certain types of data in either volatile or non-volatile memory. This can mitigate issues that can arise due to, for example, the deterministic behavior of volatile memory devices compared to the non-deterministic behavior of non-volatile memory devices. For example, computing systems in some approaches store small amounts of data that are regularly accessed during operation of the computing system in volatile memory devices while data that is larger or accessed less frequently is stored in a non-volatile memory device. However, in multi-user network deployments, the vast majority of data may be stored in volatile memory devices. In contrast, embodiments herein can allow for data storage and retrieval from a non-volatile memory device deployed in a multi-user network.

As described herein, some embodiments of the present disclosure are directed to computing systems in which data from a non-volatile, and hence, non-deterministic, memory resource is passed via an interface that is restricted to use by a volatile and deterministic memory resource in other approaches. For example, in some embodiments, data may be transferred to and from a non-volatile, non-deterministic memory resource, such as a NAND flash device, a resistance variable memory device, such as a phase change memory device and/or a resistive memory device (e.g., a three-dimensional Crosspoint (3D XP) memory device), a solid-sate drive (SSD), a self-selecting memory (SSM) device, etc. via an interface such as a DDR interface that is reserved for data transfer to and from a volatile, deterministic memory resource in some approaches. Accordingly, in contrast to approaches in which volatile, deterministic memory devices are used to provide main memory to a computing system, embodiments herein can allow for non-volatile, non-deterministic memory devices to be used as at least a portion of the main memory for a computing system.

In some embodiments, the data may be intermediately transferred from the non-volatile memory resource to a cache (e.g., a small static random-access memory (SRAM) cache) or buffer and subsequently made available to the application that requested the data. By storing data that is normally provided in a deterministic fashion in a non-deterministic memory resource and allowing access to that data as described here, computing system performance may be improved by, for example, allowing for a larger amount of memory resources to be made available to a multi-user network at a substantially reduced cost in comparison to approaches that operate using volatile memory resources.

In order to facilitate embodiments of the present disclosure, visibility to the non-volatile memory resources may be obfuscated to various devices of the computing system in which the hierarchical memory system is deployed. For example, host(s), network interface card(s), virtual machine (s), etc. that are deployed in the computing system or multi-user network may be unable to distinguish between whether data is stored by a volatile memory resource or a non-volatile memory resource of the computing system. For example, hardware circuitry may be deployed in the computing system that can register addresses that correspond to the data in such a manner that the host(s), network interface card(s), virtual machine(s), etc. are unable to distinguish whether the data is stored by volatile or non-volatile memory resources.

As described in more detail herein, a hierarchical memory system may include hardware circuitry (e.g., logic circuitry) that can intercept redirected data requests, register an address in the logic circuitry associated with the requested data (despite the hardware circuitry not being backed up by its own memory resource to store the data), and map, using the logic circuitry, the address registered in the logic circuitry to a physical address corresponding to the data in a non-volatile memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 106-1, 106-2, ..., 106-N (e.g., 106-1 to 106-N) may be referred to generally as 106. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including logic circuitry 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In some embodiments, the logic circuitry 104 can be provided as a field programmable gate array (FPGA), application-specific integrated circuit (ASIC), a number of discrete circuit components, etc., and can be referred to herein in the alternative as "hierarchical memory component."

The logic circuitry 104 can, as illustrated in FIG. 1, include a memory resource 102, which can include a read buffer 103, a write buffer 105, and/or an input/output I/O device access component 107. In some embodiments, the memory resource 102 can be a random-access memory resource, such as a block RAM, which can allow for data to be stored within the logic circuitry 104 in embodiments in which the logic circuitry 104 is a FPGA. However, embodiments are not so limited, and the memory resource 102 can comprise various registers, caches, memory arrays, latches, and SRAM, DRAM, EPROM, or other suitable memory technologies that can store data such as bit strings that include registered addresses that correspond to physical locations in which data is stored external to the logic circuitry 104. The memory resource 102 is internal to the logic circuitry 104 and is generally smaller than memory that is external to the logic circuitry 104, such as persistent and/or non-persistent memory resources that can be external to the logic circuitry 104.

The read buffer 103 can include a portion of the memory resource 102 that is reserved for storing data that has been received by the logic circuitry 104 but has not been processed by the logic circuitry 104. In some embodiments, the read buffer 103 can be around 4 Kilobytes (KB) in size, although embodiments are not limited to this particular size. The read buffer 103 can buffer data that is to be registered in one of the address registers 106-1 to 106-N.

The write buffer 105 can include a portion of the memory resource 102 that is reserved for storing data that is awaiting transmission to a location external to the logic circuitry 104. In some embodiments, the write buffer 105 can be around 4 Kilobytes (KB) in size, although embodiments are not limited to this particular size. The write buffer 105 can buffer data that is registered in one of the address registers 106-1 to 106-N.

Figure 2:
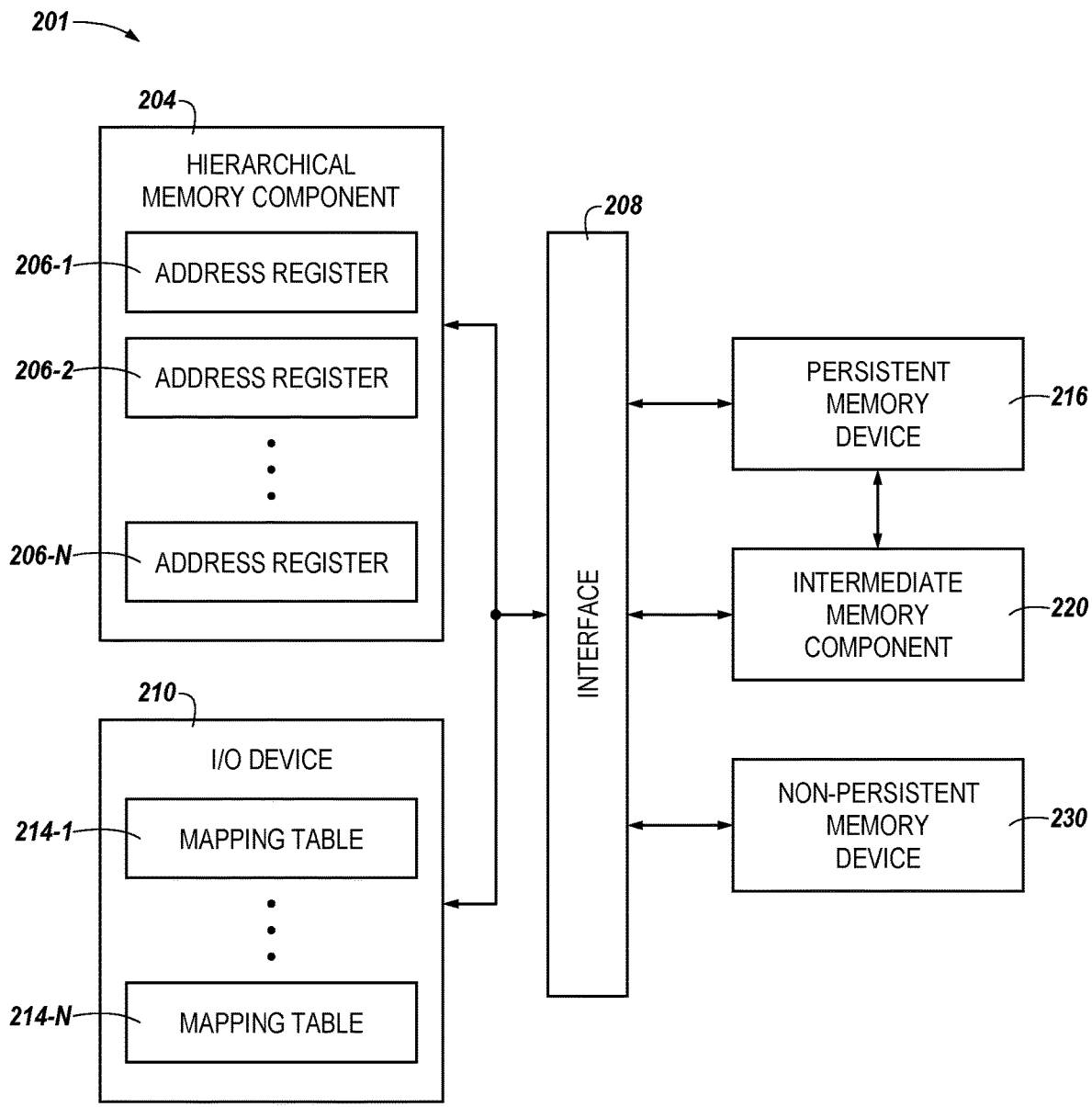
FIG. 2 is a functional block diagram in the form of a computing system including logic circuitry and an input/output (I/O) device in accordance with a number of embodiments of the present disclosure.
Figure 3:
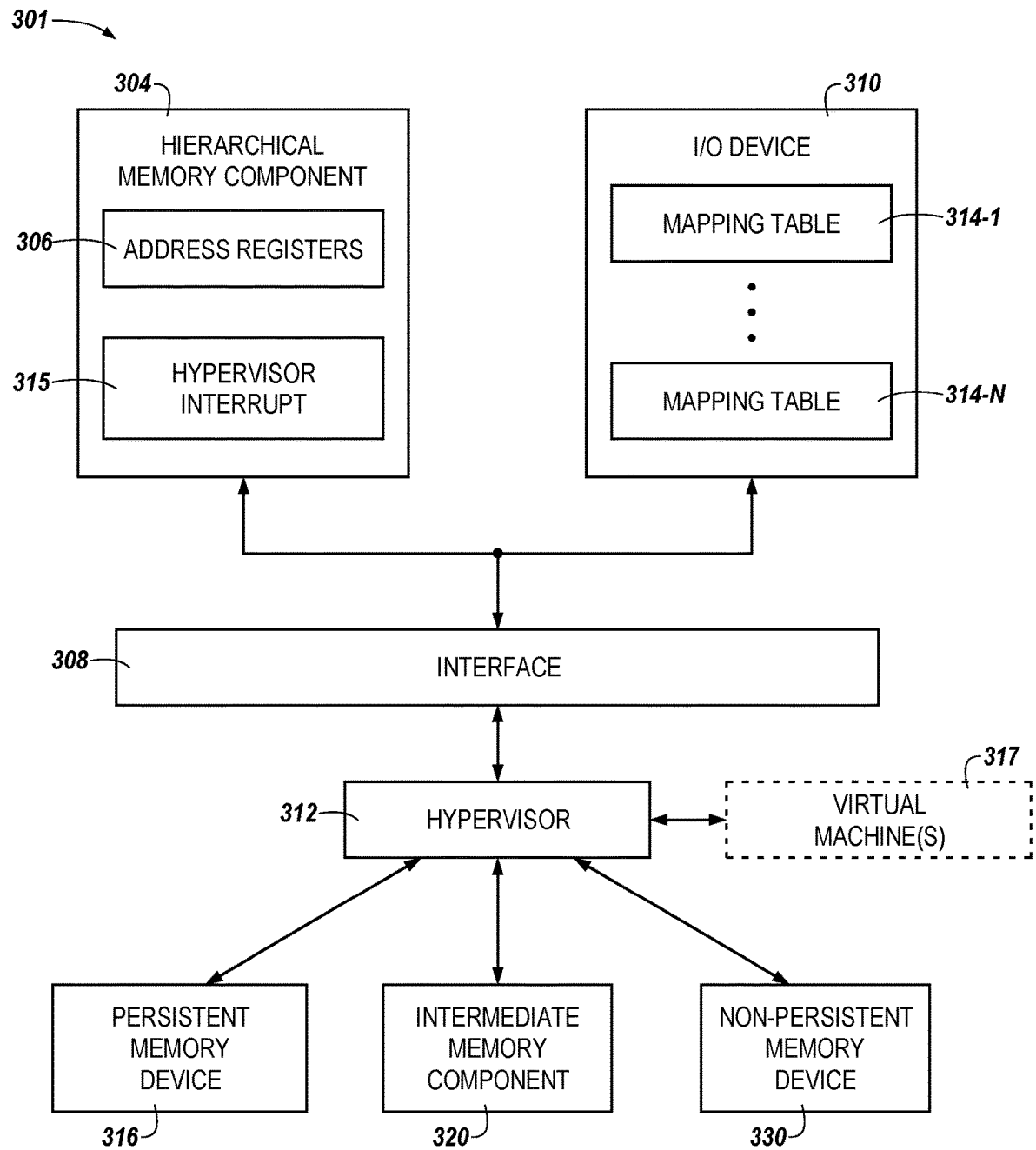
FIG. 3 is another functional block diagram in the form of a computing system including logic circuitry and an input/output (I/O) device in accordance with a number of embodiments of the present disclosure.

The I/O access component 107 can include a portion of the memory resource 102 that is reserved for storing data that corresponds to access to a component external to the logic circuitry 104, such as the I/O device 210/310 illustrated in FIGS. 2 and 3, herein. The I/O access component 107 can store data corresponding to addresses of the I/O device, which can be used to read and/or write data to and from the I/O device. In addition, the I/O access component 107 can, in some embodiments, receive, store, and/or transmit data corresponding to a status of a hypervisor (e.g., the hypervisor 312 illustrated in FIG. 3), as described in more detail in connection with FIG. 3, herein.

The logic circuitry 104 can further include a memory access multiplexer (MUX) 109, a state machine 111, and/or a hierarchical memory controller 113 (or, for simplicity, "controller"). As shown in FIG. 1, the hierarchical memory controller 113 can include a plurality of address registers 106-3 to 106-N and/or an interrupt component 115. The memory access MUX 109 can include circuitry that can comprise one or more logic gates and can be configured to control data and/or address bussing for the logic circuitry 104. For example, the memory access MUX 109 can transfer messages to and from the memory resource 102, as well as communicate with the hierarchical memory controller 113 and/or the state machine 111, as described in more detail below.

In some embodiments, the MUX 109 can redirect incoming messages and/or commands from a host (e.g., a host computing device, virtual machine, etc.) received to the logic circuitry 104. For example, the MUX 109 can redirect an incoming message corresponding to an access request from an input/output (I/O) device (e.g., the I/O device 210/310 illustrated in FIGS. 2 and 3, herein) to one of the address registers (e.g., the address register 106-N, which can be a BAR4 region of the hierarchical memory controller 113, as described below) to the read buffer 103 and/or the write buffer 105.

In addition, the MUX 109 can redirect requests (e.g., read requests, write requests) received by the logic circuitry 104. In some embodiments, the requests can be received by the logic circuitry 104 from a hypervisor (e.g., the hypervisor 312 illustrated in FIG. 3, herein), a bare metal server, or host computing device communicatively coupled to the logic circuitry 104. Such requests may be redirected by the MUX 109 from the read buffer 103, the write buffer 105, and/or the I/O access component 107 to an address register (e.g., the address register 106-2, which can be a BAR2 region of the hierarchical memory controller 113, as described below).

The MUX 109 can redirect such requests as part of an operation to determine an address in the address register(s) 106 that is to be accessed. In some embodiments, the MUX 109 can redirect such requests as part of an operation to determine an address in the address register(s) that is to be accessed in response to assertion of a hypervisor interrupt (e.g., an interrupt asserted to a hypervisor coupled to the logic circuitry 104 that is generated by the interrupt component 115).

In response to a determination that the request corresponds to data (e.g., data associated with an address being written to a location external to the logic circuitry 104 (e.g., to a persistent memory device such as the persistent memory device 216/316 illustrated in FIGS. 2 and 3, herein)), the MUX 109 can facilitate retrieval of the data, transfer of the data to the write buffer 105, and/or transfer of the data to the location external to the logic circuitry 104. In response to a determination that the request corresponds to data being read from a location external to the logic circuitry 104 (e.g., from the persistent memory device), the MUX 109 can facilitate retrieval of the data, transfer of the data to the read buffer 103, and/or transfer of the data or address information associated with the data to a location internal to the logic circuitry 104, such as the address register(s) 106.

As a non-limiting example, if the logic circuitry 104 receives a read request from the I/O device, the MUX 109 can facilitate retrieval of data from a persistent memory device via the hypervisor by selecting the appropriate messages to send from the logic circuitry 104. For example, the MUX 109 can facilitate generation of an interrupt using the interrupt component 115, cause the interrupt to be asserted on the hypervisor, buffer data received from the persistent memory device into the read buffer 103, and/or respond to the I/O device with an indication that the read request has been fulfilled. In a non-limiting example in which the logic circuitry 104 receives a write request from the I/O device, the MUX 109 can facilitate transfer of data to a persistent memory device via the hypervisor by selecting the appropriate messages to send from the logic circuitry 104. For example, the MUX 109 can facilitate generation of an interrupt using the interrupt component 115, cause the interrupt to be asserted on the hypervisor, buffer data to be transferred to the persistent memory device into the write buffer 105, and/or respond to the I/O device with an indication that the write request has been fulfilled.

The state machine 111 can include one or more processing devices, circuit components, and/or logic that are configured to perform operations on an input and produce an output. In some embodiments, the state machine 111 can be a finite state machine (FSM) or a hardware state machine that can be configured to receive changing inputs and produce a resulting output based on the received inputs. For example, the state machine 111 can transfer access info (e.g., "I/O ACCESS INFO") to and from the memory access multiplexer 109, as well as interrupt configuration information (e.g., "INTERRUPT CONFIG") and/or interrupt request messages (e.g., "INTERRUPT REQUEST") to and from the hierarchical memory controller 113. In some embodiments, the state machine 111 can further transfer control messages (e.g., "MUX CTRL") to and from the memory access multiplexer 109.

The ACCESS INFO message can include information corresponding to a data access request received from an I/O device external to the logic circuitry 104. In some embodiments, the ACCESS INFO can include logical addressing information that corresponds to data that is to be stored in a persistent memory device or addressing information that corresponds to data that is to be retrieved from the persistent memory device.

The INTERRUPT CONFIG message can be asserted by the state machine 111 on the hierarchical memory controller 113 to configure appropriate interrupt messages to be asserted external to the logic circuitry 104. For example, when the logic circuitry 104 asserts an interrupt on a hypervisor coupled to the logic circuitry 104 as part of fulfilling a redirected read or write request, the INTERRUPT CONFIG message can be generated by the state machine 111 to generate an appropriate interrupt message based on whether the operation is an operation to retrieve data from a persistent memory device or an operation to write data to the persistent memory device.

The INTERRUPT REQUEST message can be generated by the state machine 111 and asserted on the interrupt component 115 to cause an interrupt message to be asserted on the hypervisor (or bare metal server or other computing device). As described in more detail herein, the interrupt 115 can be asserted on the hypervisor to cause the hypervisor to prioritize data retrieval or writing of data to the persistent memory device as part of operation of a hierarchical memory system.

The MUX CTRL message(s) can be generated by the state machine 111 and asserted on the MUX 109 to control operation of the MUX 109. In some embodiments, the MUX CTRL message(s) can be asserted on the MUX 109 by the state machine 111 (or vice versa) as part of performance of the MUX 109 operations described above.

The hierarchical memory controller 113 can include a core, such as an integrated circuit, chip, system-on-a-chip, or combinations thereof. In some embodiments, the hierarchical memory controller 113 can be a peripheral component interconnect express (PCIe) core. As used herein, a "core" refers to a reusable unit of logic, processor, and/or co-processors that receive instructions and perform tasks or actions based on the received instructions.

The hierarchical memory controller 113 can include address registers 106-1 to 106-N and/or an interrupt component 115. The address registers 106-1 to 106-N can be base address registers (BARs) that can store memory addresses used by the logic circuitry 104 or a computing system (e.g., the computing system 201/301 illustrated in FIGS. 2 and 3, herein). At least one of the address registers (e.g., the address register 106-1) can store memory addresses that provide access to internal registers of the logic circuitry 104 from an external location such as the hypervisor 312 illustrated in FIG. 3.

A different address register (e.g., the address register 106-2) can be used to store addresses that correspond to interrupt control, as described in more detail herein. In some embodiments, the address register 106-2 can map direct memory access (DMA) read and DMA write control and/or status registers. For example, the address register 106-2 can include addresses that correspond to descriptors and/or control bits for DMA command chaining, which can include the generation of one or more interrupt messages that can be asserted to a hypervisor as part of operation of a hierarchical memory system, as described in connection with FIG. 3, herein.

Yet another one of the address registers (e.g., the address register 106-3) can store addresses that correspond to access to and from a hypervisor (e.g., the hypervisor 312 illustrated in FIG. 3, herein). In some embodiments, access to and/or from the hypervisor can be provided via an Advanced eXtensible Interface (AXI) DMA associated with the logic circuitry 104. In some embodiments, the address register can map addresses corresponding to data transferred via a DMA (e.g., an AXI DMA) of the logic circuitry 104 to a location external to the logic circuitry 104.

In some embodiments, at least one address register (e.g., the address register 106-N) can store addresses that correspond to I/O device (e.g., the I/O device 210 illustrated in FIG. 2) access to the logic circuitry 104. The address register 106-N may store addresses that are bypassed by DMA components associated with the logic circuitry 104. The address register 106-N can be provided such that addresses mapped thereto are not "backed up" by a physical memory location of the logic circuitry 104. That is, in some embodiments, the logic circuitry 104 can be configured with an address space that stores addresses that correspond to data stored in a persistent memory device (e.g., the persistent memory device 216 illustrated in FIG. 2) and not to data stored by the logic circuitry 104. For example, the address register 106-N can be configured as a virtual address space that can store logical addresses that correspond to physical memory locations (e.g., in a memory device) in which data is stored.

In some embodiments, the address register 106-N can include a quantity of address spaces that correspond to a size of a memory device (e.g., the persistent memory device 216/316 illustrated in FIGS. 2 and 3, herein). For example, if the memory device contains one terabyte of storage, the address register 106-N can be configured to have an address space that can include one terabyte of address space. However, as described above, the address register 106-N does not actually include one terabyte of storage and instead is configured to appear to have one terabyte of storage space.

Although not explicitly shown in FIG. 1, the logic circuitry 104 can be coupled to a host computing system. The host computing system can include a system motherboard and/or backplane and can include a number of processing resources (e.g., one or more processors, microprocessors, or some other type of controlling circuitry). The host and the apparatus 100 can be, for instance, a server system and/or a high-performance computing (HPC) system and/or a portion thereof. In some embodiments, the computing system can have a Von Neumann architecture, however, embodiments of the present disclosure can be implemented in non-Von Neumann architectures, which may not include one or more components (e.g., CPU, ALU, etc.) often associated with a Von Neumann architecture.

As described herein, the logic circuitry 104 can receive incoming messages and/or commands from the host (e.g., a host computing device, virtual machine, etc.) via an I/O device (e.g., I/O device 210/310 illustrated in FIGS. 2 and 3, herein), which redirects the messages and/or commands to the logic circuitry 104 and/or a non-persistent memory device (e.g., non-persistent memory device 230/330 as illustrated in FIGS. 2 and 3, herein). The incoming messages and/or commands redirected to the logic circuitry from the I/O device can include a request for data to be read from and/or written to a persistent memory device (e.g., persistent memory device 216/316 illustrated in FIGS. 2 and 3, herein) along with data to be written to the persistent memory device.

As data being transferred to/from the persistent memory device are typically of a comparably larger size, reducing (to read data from and/or write data to the persistent memory device) a number of data transfers made among components of a computing system (e.g., computing system 201/301 illustrated in FIGS. 2 and 3) can substantially improve an overall processing speed of the computing system. Accordingly, in a number of embodiments, a particular device, such as the I/O device, of the computing system that firstly receives a request from the host can be configured as a device to determine where to redirect the request. This can provide a fewer number of transfers than would have been made by having a different device (e.g., other than the I/O device that firstly receives a request from the host) to determine where to redirect the request. Further details of utilizing I/O device to redirect the request and the data are described below in connection with FIGS. 2-6.

FIG. 2 is a functional block diagram in the form of a computing system 201 including logic circuitry 204 (e.g., logic circuitry) and an input/output (I/O) device in accordance with a number of embodiments of the present disclosure. As shown in FIG. 2, the computing system 201 can include logic circuitry 204, which can be analogous to the logic circuitry 104 illustrated in FIG. 1. In addition, the computing system 201 can include an I/O device 210, a persistent memory device 216, a non-persistent memory device 230, and an intermediate memory component 220. Communication between the logic circuitry 204, the I/O device 210 and the persistent memory device 216, and the non-persistent memory device 230 may be facilitated via an interface 208.

The persistent memory device 216 can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes.

The persistent memory device 216 can include volatile memory and/or non-volatile memory. In a number of embodiments, the persistent memory device 216 can include a multi-chip device. A multi-chip device can include a number of different memory types and/or memory modules. For example, a memory system can include non-volatile or volatile memory on any type of a module. In embodiments in which the persistent memory device 216 includes non-volatile memory, the persistent memory device 216 can be a flash memory device such as NAND or NOR flash memory devices.

Embodiments are not so limited, however, and the persistent memory device 216 can include other non-volatile memory devices such as non-volatile random-access memory devices (e.g., NVRAM, ReRAM, FeRAM, MRAM, PCM), "emerging" memory devices such as resistance variable memory devices (e.g., resistive and/or phase change memory devices such as a 3D Crosspoint (3D XP) memory device), memory devices that include an array of self-selecting memory (SSM) cells, etc., or combinations thereof. A resistive and/or phase change array of non-volatile memory can perform bit storage based on a change of bulk resistance, in conjunction with a stackable cross-gridded data access array. Additionally, in contrast to many flash-based memories, resistive and/or phase change memory devices can perform a write in-place operation, where a non-volatile memory cell can be programmed without the non-volatile memory cell being previously erased. In contrast to flash-based memories, self-selecting memory cells can include memory cells that have a single chalcogenide material that serves as both the switch and storage element for the memory cell.

The persistent memory device 216 can provide a storage volume for the computing system 201 and can therefore be used as additional memory or storage throughout the computing system 201, main memory for the computing system 201, or combinations thereof. Embodiments are not limited to a particular type of memory device, however, and the persistent memory device 216 can include RAM, ROM, SRAM DRAM, SDRAM, PCRAM, RRAM, and flash memory, among others. Further, although a single persistent memory device 216 is illustrated in FIG. 2, embodiments are not so limited, and the computing system 201 can include one or more persistent memory devices 216, each of which may or may not have a same architecture associated therewith. As a non-limiting example, in some embodiments, the persistent memory device 216 can comprise two discrete memory devices that are different architectures, such as a NAND memory device and a resistance variable memory device.

The non-persistent memory device 230 can include volatile memory, such as an array of volatile memory cells. In a number of embodiments, the non-persistent memory device 230 can include a multi-chip device. A multi-chip device can include a number of different memory types and/or memory modules. In some embodiments, the non-persistent memory device 230 can serve as the main memory for the computing system 201. For example, the non-persistent memory device 230 can be a dynamic random-access (DRAM) memory device that is used to provide main memory to the computing system 230. Embodiments are not limited to the non-persistent memory device 230 comprising a DRAM memory device, however, and in some embodiments, the non-persistent memory device 230 can include other non-persistent memory devices such as RAM, SRAM DRAM, SDRAM, PCRAM, and/or RRAM, among others.

The non-persistent memory device 230 can store data that can be requested by, for example, a host computing device as part of operation of the computing system 201. For example, when the computing system 201 is part of a multi-user network, the non-persistent memory device 230 can store data that can be transferred between host computing devices (e.g., virtual machines deployed in the multi-user network) during operation of the computing system 201.

In some approaches, non-persistent memory such as the non-persistent memory device 230 can store all user data accessed by a host (e.g., a virtual machine deployed in a multi-user network). For example, due to the speed of non-persistent memory, some approaches rely on non-persistent memory to provision memory resources for virtual machines deployed in a multi-user network. However, in such approaches, costs can be become an issue due to non-persistent memory generally being more expensive than persistent memory (e.g., the persistent memory device 216).

In contrast, as described in more detail below, embodiments herein can allow for at least some data that is stored in the non-persistent memory device 230 to be stored in the persistent memory device 216. This can allow for additional memory resources to be provided to a computing system 201, such as a multi-user network, at a lower cost than approaches that rely on non-persistent memory for user data storage.

The computing system 201 can include an I/O device 210, which can be communicatively coupled to the logic circuitry 204 and the non-persistent memory device via the interface 208. The I/O device 210 can be a device that is configured to provide direct memory access via a physical address and/or a virtual machine physical address. In some embodiments, the I/O device 210 can be a network interface card (NIC) or network interface controller, a storage device, a graphics rendering device, or other I/O device. The I/O device 210 can be a physical I/O device or the I/O device 210 can be a virtualized I/O device 210. For example, in some embodiments, the I/O device 210 can be a physical card that is physically coupled to a computing system via a bus or interface such as a PCIe interface or other suitable interface. In embodiments in which the I/O device 210 is a virtualized I/O device 210, the virtualized I/O device 210 can provide I/O functionality in a distributed manner.

The I/O device 210 can include a number of mapping tables 214 (e.g., mapping tables 214-1, . . . , 214-N), which can be utilized to map device-visible virtual addresses to physical addresses. For example, when a read/write request is received from a host computing device to the I/O device 210, the I/O device can map virtual addresses associated with data of the request to physical address in the non-persistent memory device 230 and/or addresses in the logic circuitry 204, which can be further mapped to corresponding physical addresses in the persistent memory device 216. By utilizing the mapping tables 214, the I/O device 210 can determine where to redirect the request received from the host computing device. For example, if the mapping tables 214 indicates that an address associated with the data of the request is mapped to a physical address of the non-persistent memory device 230, the I/O device 210 can redirect the request to the non-persistent memory device 230. For example, if the mapping tables 214 indicates that an address associated with the data of the request is mapped to an address in the logic circuitry 204, the I/O device 210 can redirect the request to the logic circuitry 204, which can transfer the request redirected from the I/O device 210 to the persistent memory device 216.

In some embodiments, mapping the virtual entries associated with the I/O device 210 can be facilitated by the read buffer, write buffer, and/or I/O access buffer illustrated in FIG. 1, herein. The logic circuitry 204 can store virtual address information associated with a read/write request received at the I/O device 210 in an address register (e.g., address register 206-1, 206-1, . . . , and/or 206-N) of the logic circuitry 204. In some embodiments, the address register 206-N can be a particular base address register of the logic circuitry 204, such as a BAR4 address register.

In some embodiments, the interface 208 can be a PCIe interface and can therefore pass information between the I/O device 210 and the logic circuitry 204 according to PCIe protocols. Embodiments are not so limited, however, and in some embodiments the interface 208 can be an interface or bus that functions according to another suitable protocol.

After the virtual NIC address is stored in the logic circuitry 204, the data corresponding to the virtual NIC address can be written to the persistent memory device 216. For example, the data corresponding to the virtual NIC address stored in the logic circuitry 204 can be stored in a physical address location of the persistent memory device 216. In some embodiments, transferring the data to and/or from the persistent memory device 216 can be facilitated by a hypervisor, as described in connection with FIGS. 3-5, herein.

When the data is requested by, for example, a host computing device, such as a virtual machine deployed in the computing system 201, the request can be redirected from the I/O device 210 to the logic circuitry 204. Because the virtual NIC address corresponding to the physical location of the data in the persistent memory device 216 is stored in one of the address registers 206 (e.g., address register 206-N) of the logic circuitry 204, the logic circuitry 204 can facilitate retrieval of the data from the persistent memory device 216, in connection with a hypervisor, as described in more detail in connection with FIGS. 3-5, herein.

In some embodiments, when data that has been stored in the persistent memory device 216 is transferred out of the persistent memory device 216 (e.g., when data that has been stored in the persistent memory device 216 is requested by a host computing device), the data may be transferred to the intermediate memory component 220 and/or the non-persistent memory device 230 prior to being provided to the host computing device. For example, because data transferred to the host computing device may be transferred in a deterministic fashion (e.g., via a DDR interface), the data may be transferred temporarily to a memory that operates using a DDR bus, such as the intermediate memory component 220 and/or the non-persistent memory device 230, prior to a data request being fulfilled.

FIG. 3 is another functional block diagram in the form of a computing system including logic circuitry and an I/O device in accordance with a number of embodiments of the present disclosure. As shown in FIG. 3, the computing system 301 can include logic circuitry 304, which can be analogous to the logic circuitry 104/204 illustrated in FIGS. 1 and 2. In addition, the computing system 301 can include an I/O device 310, a persistent memory device 316, a non-persistent memory device 330, an intermediate memory component 320, and a hypervisor 312.

In some embodiments, the computing system 301 can be a multi-user network, such as a software defined data center, cloud computing environment, etc. In such embodiments, the computing system can be configured to have one or more virtual machines 317 running thereon. For example, in some embodiments, one or more virtual machines 317 can be deployed on the hypervisor 312 and can be accessed by users of the multi-user network.

The I/O device 310, the persistent memory device 316, the non-persistent memory device 330, and the intermediate memory component 320 can be analogous to the I/O device 210, the persistent memory device 216, the non-persistent memory device 230, and the intermediate memory component 220 illustrated in FIG. 2. Communication between the logic circuitry 304, the I/O device 310 and the persistent memory device 316, the non-persistent memory device 330, and the hypervisor 312 may be facilitated via an interface 308, which may be analogous to the interface 208 illustrated in FIG. 2.

As described above in connection with FIG. 2, the I/O device 310 can cause a read request or a write request received from a host (e.g., host computing device, virtual machine, etc.) to be redirected to the logic circuitry 304. The logic circuitry 304 can generate and/or store a logical address corresponding to the requested data. As described above, the logic circuitry 304 can store the logical address corresponding to the requested data in a base address register, such as the address register 306-N of the logic circuitry 304.

As shown in FIG. 3, the hypervisor 312 can be in communication with the logic circuitry 304 and/or the I/O device 310 via the interface 308. The hypervisor 312 can transmit data between the logic circuitry 304 via a NIC access component (e.g., the NIC access component 107 illustrated in FIG. 1) of the logic circuitry 304. In addition, the hypervisor 312 can be in communication with the persistent memory device 316, the non-persistent memory device 330, and the intermediate memory component 320. The hypervisor can be configured to execute specialized instructions to perform operations and/or tasks described herein.

For example, the hypervisor 312 can execute instructions to monitor data traffic and data traffic patterns to determine whether data should be stored in the non-persistent memory device 330 or if the data should be transferred to the persistent memory device 316. That is, in some embodiments, the hypervisor 312 can execute instructions to learn user data request patterns over time and selectively store portions of the data in the non-persistent memory device 330 or the persistent memory device 316 based on the patterns. This can allow for data that is accessed more frequently to be stored in the non-persistent memory device 330 while data that is accessed less frequently to be stored in the persistent memory device 316.

Because a user may access recently used or viewed data more frequently than data that has been used less recently or viewed less recently, the hypervisor can execute specialized instructions to cause the data that has been used or viewed less recently to be stored in the persistent memory device 316 and/or cause the data that has been accessed or viewed more recently in the non-persistent memory device 330. In a non-limiting example, a user may view photographs on social media that have been taken recently (e.g., within a week, etc.) more frequently than photographs that have been taken less recently (e.g., a month ago, a year ago, etc.). Based on this information, the hypervisor 312 can execute specialized instructions to cause the photographs that were viewed or taken less recently to be stored in the persistent memory device 316, thereby reducing an amount of data that is stored in the non-persistent memory device 330. This can reduce an overall amount of non-persistent memory that is necessary to provision the computing system 301, thereby reducing costs and allowing for access to the non-persistent memory device 330 to more users.

In operation, the computing system 301 can be configured to intercept a data request from the I/O device 310 and redirect the request to the logic circuitry 304. In some embodiments, the hypervisor 312 can control whether data corresponding to the data request is to be stored in (or retrieved from) the non-persistent memory device 330 or in the persistent memory device 316. For example, the hypervisor 312 can execute instructions to selectively control if the data is stored in (or retrieved from) the persistent memory device 316 or the non-persistent memory device 330.

As part of controlling whether the data is stored in (or retrieved from) the persistent memory device 316 and/or the non-persistent memory device 330, the hypervisor 312 can cause the I/O device 310 to map addresses associated with the data to be redirected to the logic circuitry 304 and stored in the address registers 306 of the logic circuitry 304. For example, the hypervisor 312 can execute instructions to control read and write requests involving the data to be selectively redirected to the logic circuitry 304 via the I/O device 310.

The I/O device 310 can map contiguous virtual addresses to underlying fragmented physical addresses. Accordingly, in some embodiments, the I/O device 310 can allow for virtual addresses to be mapped to physical addresses without the requirement that the physical addresses are contiguous. Further, in some embodiments, the I/O device 310 can allow for devices that do not support memory addresses long enough to address their corresponding physical memory space to be addressed in the I/O device 310.

Due to the non-deterministic nature of data transfer associated with the persistent memory device 316, the logic circuitry 304 can, in some embodiments, be configured to inform the computing system 301 that a delay in transferring the data to or from the persistent memory device 316 may be incurred. As part of initializing the delay, the logic circuitry 304 can provide page fault handling for the computing system 301 when a data request is redirected to the logic circuitry 304. In some embodiments, the logic circuitry 304 can generate and assert an interrupt to the hypervisor 312 to initiate an operation to transfer data into or out of the persistent memory device 316. For example, due to the non-deterministic nature of data retrieval and storage associated with the persistent memory device 316, the logic circuitry 304 can generate a hypervisor interrupt 315 when a transfer of the data that is stored in the persistent memory device 316 is requested.

In response to the page fault interrupt generated by the logic circuitry 304, the hypervisor 312 can retrieve information corresponding to the data from the logic circuitry

304. For example, the hypervisor 312 can receive NIC access data from the logic circuitry, which can include logical to physical address mappings corresponding to the data that are stored in the address registers 306 of the logic circuitry 304.

Once the data has been stored in the persistent memory device 316, a portion of the non-persistent memory device 330 (e.g., a page, a block, etc.) can be marked as inaccessible by the logic circuitry 304 so that the computing system 301 does not attempt to access the data from the non-persistent memory device 330. This can allow a data request to be intercepted with a page fault, which can be generated by the logic circuitry 304 and asserted to the hypervisor 312 when the data that has been stored in the persistent memory device 316 is requested by the I/O device 310.

In contrast to approaches in which a page fault exception is raised in response to an application requesting access to a page of memory that is not mapped by the I/O device 310, in embodiments of the present disclosure, the page fault described above can be generated by the logic circuitry 304 in response to the data being mapped in the I/O device 310 to the logic circuitry 304, which, in turn maps the data to the persistent memory device 316.

In some embodiments, the intermediate memory component 320 can be used to buffer data that is stored in the persistent memory device 316 in response to a data request initiated by the I/O device 310. In contrast to the persistent memory device 316, which may pass data via a PCIe interface, the intermediate memory component 320 may employ a DDR interface to pass data. Accordingly, in some embodiments, the intermediate memory component 320 may operate in a deterministic fashion. For example, in some embodiments, data requested that is stored in the persistent memory device 316 can be temporarily transferred from the persistent memory device 316 to the intermediate memory component 320 and subsequently transferred to a host computing device via a DDR interface coupling the intermediate memory component 320 to the I/O device 310.

In some embodiments, the intermediate memory component can comprise a discrete memory component (e.g., an SRAM cache) deployed in the computing system 301. However, embodiments are not so limited and, in some embodiments, the intermediate memory component 320 can be a portion of the non-persistent memory device 330 that can be allocated for use in transferring data from the persistent memory device 316 in response to a data request.

In a non-limiting example, an I/O device (e.g., the I/O device 310) can be coupled to logic circuitry (e.g., logic circuitry 304) and a non-persistent memory device (e.g., non-persistent memory device 330). The I/O device can be configured to receive signaling that includes a command to write data to an address corresponding to a non-persistent memory device. The I/O device can be further configured to map the received address to an address in the logic circuitry or a physical address in the non-persistent memory device based at least in part on one or more characteristics of the data. The one or more characteristics of the data can include how frequently the data is requested or accessed, an amount of time that has transpired since the data was last accessed or requested, a type of data (e.g., whether the data corresponds to a particular file type such as a photograph, a document, an audio file, an application file, etc.), among others. The I/O device can be further configured to write the data to the logic circuitry based at least in part on the received address being mapped to the address in the logic circuitry to cause the logic circuitry to write the data in the persistent memory device. In some embodiments, the I/O device can be configured to write the data to a location of the non-persistent memory device corresponding to the physical address based at least in part on the received address being mapped to the physical address in the non-persistent memory device.

In some embodiments, the I/O device can include a mapping table (e.g., mapping tables 314). The I/O device can be configured to store, in the mapping table, the received address and a corresponding address to which the received address is mapped. Therefore, the I/O device can determine, in response to receipt of a request to access the data previously stored in the persistent memory device (e.g., persistent memory device 316), that the received address is mapped to the address in the logic circuitry based on the mapping table, and redirect the request to access the data to the logic circuitry, for example, to cause the logic circuitry to access the data from the persistent memory device.

In another non-limiting example, an I/O device (e.g., I/O device 310), the I/O device can be coupled to logic circuitry (e.g., logic circuitry 304) that is coupled to a persistent memory device (e.g., persistent memory device 316), and a non-persistent memory device (e.g., non-persistent memory device 330). The I/O device can include first addresses mapped to respective physical addresses in the non-persistent memory device and second addresses mapped to respective addresses in the logic circuitry. The I/O device can be configured to receive signaling that includes a command to access data from an address corresponding to a non-persistent memory device and determine that the received address is one of the second addresses. The I/O device can be further configured to redirect, to cause the logic circuitry to access the data from the persistent memory device, the command to the logic circuitry based at least in part on the received address being determined to be one of the second addresses.

In some embodiments, the I/O can be configured to determine that the received address is one of the first addresses and redirect the command to the non-persistent memory device. The I/O device can be further configured to receive the data from the non-persistent memory device in response to redirecting the command to the non-persistent memory device.

In some embodiments, the first addresses and the second addresses can be respective virtual machine physical addresses. In some embodiments, the first addresses and the second addresses can be stored in a mapping table (e.g., mapping tables 314).

In another non-limiting example, a system can include logic circuitry (e.g., logic circuitry 304), non-persistent memory device (e.g., non-persistent memory device 330) coupled to the logic circuitry via an interface (e.g., interface 308), and an I/O device (e.g., I/O device 310) coupled to the logic circuitry and coupled to the non-persistent memory device via the interface. The I/O device can be configured to receive, from a host, signaling that includes a command to access data from an address corresponding to a non-persistent memory device and determine, based at least in part on mapping tables (e.g., mapping table 314) stored in the I/O device, whether an received address corresponds to an address in the logic circuitry or a physical address in the non-persistent memory device. The I/O device can be further configured to redirect the command to the logic circuitry or the non-persistent memory device, or both based on the determination. For example, the I/O device can be configured to redirect the command to the logic circuitry in response to the received address corresponding to the address in the logic circuitry. For example, the I/O device can be further configured to redirect the command to the non-persistent memory device in response to the received address corresponding to the physical address in the non-persistent memory device.

In some embodiments, in response to the command being redirected from the I/O device to the logic circuitry, the logic circuitry can be configured to retrieve the data from the persistent memory device via the interface and transfer the retrieved data to the I/O device. In some embodiments, the logic circuitry can be configured to receive the command redirected from the I/O device. In response to the command being redirected from the I/O device to the logic circuitry, the logic circuitry can be configured to transfer the command to a hypervisor (e.g., hypervisor 312) communicatively coupled to the logic circuitry via an interface. The logic circuitry can be further configured to assert an interrupt signal to the hypervisor communicatively as part of the transferred command. The interface can include a PCIe interface.

In some embodiments, the logic circuitry can be configured to receive signaling that includes a a command to write data to an address corresponding the non-persistent memory device. In response to the command received from the host, the hypervisor can be configured to cause, based at least in part on one or more characteristics of the data, the I/O device to map the address associated with the command to write the data to a physical address in the non-persistent memory device or an address in the logic circuitry. As described herein, the characteristics of the data can include how frequently the data is requested or accessed, an amount of time that has transpired since the data was last accessed or requested, a type of data (e.g., whether the data corresponds to a particular file type such as a photograph, a document, an audio file, an application file, etc.), among others.

In some embodiments, the logic circuitry can be configured to associate information with the data that indicates that the data is inaccessible by the non-persistent memory device in response to the received address corresponding to the address in the logic circuitry. The logic circuitry can include a buffer configured to store the data to be written to the persistent memory device or transferred to the I/O device.

In some embodiments, the non-persistent memory device can include a dynamic random access memory (DRAM) cells, while the persistent memory device can include an array of resistive memory cells, a phase change memory device, an array of self-selecting memory cells, or combinations thereof.

Figure 4:
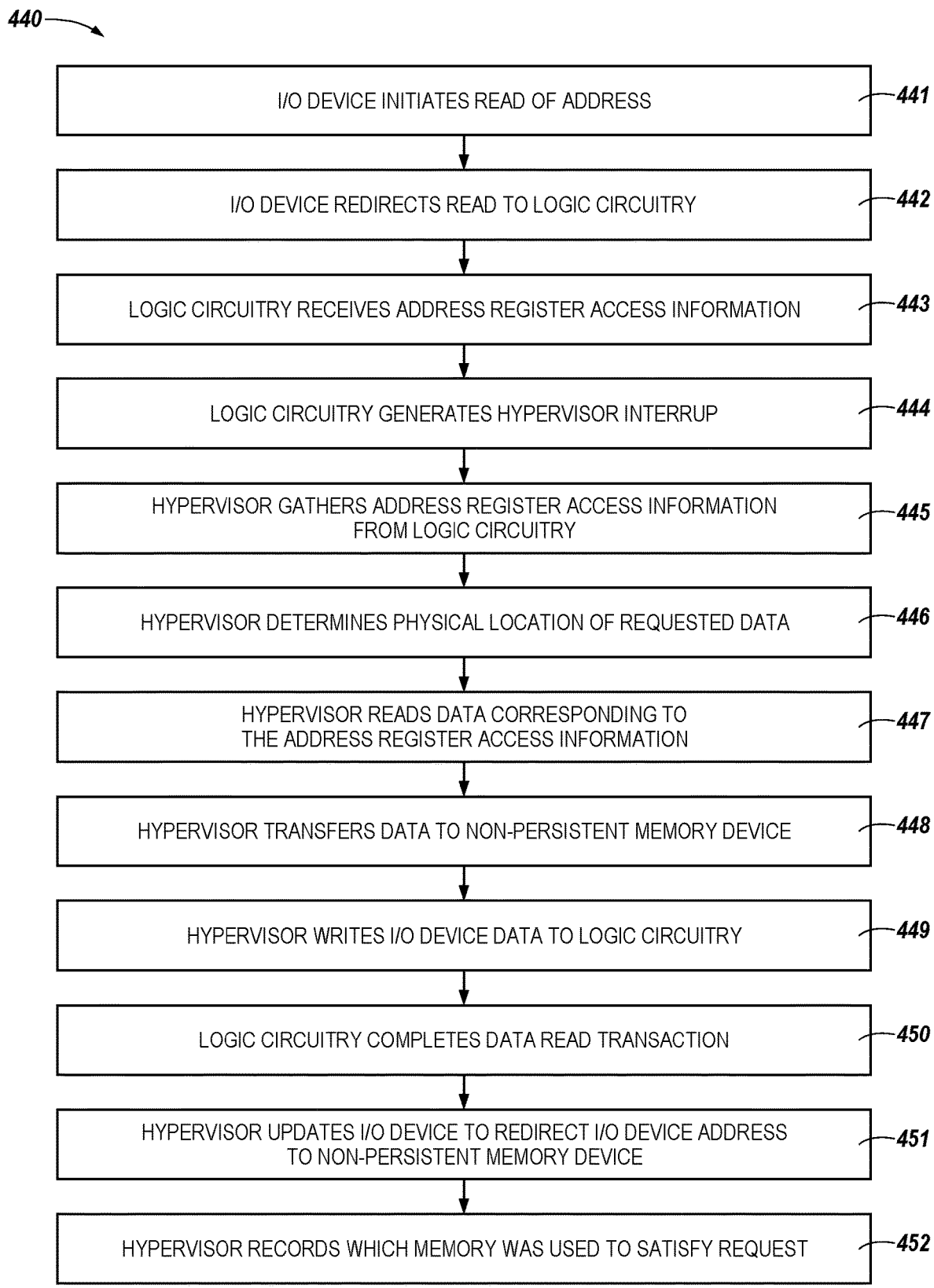
FIG. 4 is a flow diagram representing a data read operation in accordance with a number of embodiments of the present disclosure.

FIG. 4 is a flow diagram 440 representing a data read operation in accordance with a number of embodiments of the present disclosure. At block 441, an I/O device, such as the I/O device 210/310 illustrated in FIGS. 2 and 3 can initiate a read operation using an address corresponding to a data request. In some embodiments, the address can be a physical address, such as a virtual machine physical address. The data request can include a request to read data and a corresponding address (e.g., physical address) that can correspond to a location in a persistent memory device (e.g., the persistent memory device 216/316 illustrated in FIGS. 2 and 3, herein) or a location in a non-persistent memory device (e.g., the non-persistent memory device 230/330 illustrated in FIGS. 2 and 3, herein). As described herein, information with regards to whether the physical address corresponds to a location in the persistent memory device or in the non-persistent memory device can be stored in a number of mapping tables (e.g., mapping tables 214/314 illustrated in FIGS. 2 and 3, herein) of the I/O device.

By utilizing the mapping tables, the I/O device can determine whether the requested data is stored in the non-persistent memory device or in the persistent memory device. If the data is stored in the non-persistent memory device, the data may be retrieved, and the data request can be fulfilled. However, if the data is stored in the persistent memory device (e.g., if the physical address of the data corresponds to a location in the persistent memory device), at block 442, the I/O device can redirect the data request to logic circuitry (e.g., the logic circuitry 104/204/304 illustrated in FIGS. 1-3, herein). As described above, the data request can be redirected based on information (e.g., a command or instructions executed) by a hypervisor (e.g., the hypervisor 312 illustrated in FIG. 3, herein).

At block 443, the logic circuitry can receive address register access information corresponding to the data request. In some embodiments, the address register access information can correspond to a location in an address register (e.g., the address registers 106/206/306 illustrated in FIGS. 1-3, herein). For example, the address register access information can correspond to a location in an address register in the logic circuitry in which a logical address corresponding to a physical address in the persistent memory device in which the data is stored.

The logic circuitry can, at block 444, generate a hypervisor interrupt. For example, as described above in connection with FIG. 3, once the logic circuitry has received the redirected data request from the I/O device, the logic circuitry can generate an interrupt and assert the interrupt on a hypervisor (e.g., the hypervisor 312 illustrated in FIG. 3, herein). In some embodiments, the interrupt can be a signal that is asserted on the hypervisor to inform the hypervisor that an event needs immediate attention. For example, the interrupt signal can be asserted on the hypervisor to cause the hypervisor to interrupt instructions that are being currently executed and instead execute instructions associated with gathering the address register access information at block 445.

At block 445, the hypervisor can gather the address register access information from the logic circuitry. For example, the hypervisor can receive logical address information from the logic circuitry that corresponds to the physical address of the requested data. The logical address information can be stored in the logic circuitry in an address register (e.g., a base address register) of the logic circuitry, such as the address register(s) 106/206/306 illustrated in FIGS. 1-3, herein.

At block 446, the hypervisor can determine a physical location of the requested data. For example, based on the address register access information and, hence, the logical address associated with the data gathered from the logic circuitry, the hypervisor can determine the physical location of the data stored in the persistent memory device.

At block 447, the hypervisor can read the data corresponding to the address register access information. That is, in some embodiments, the hypervisor can cause the requested data to be read (e.g., retrieved) from the persistent memory device.

At block 448, the hypervisor can cause the data to be transferred to a non-persistent memory device. In some embodiments, the non-persistent memory device can be the non-persistent memory device 230/330 illustrated in FIGS. 2 and 3, herein, however embodiments are not so limited and in some embodiments, the hypervisor can cause the data to be transferred to an intermediate memory component, such as the intermediate memory component 220/320 illustrated in FIGS. 2 and 3, herein.

At block 449, the hypervisor can write I/O device data corresponding to the requested data to the logic circuitry.

The I/O device data can be stored in an address register of the logic circuitry, as described above.

At block 450, the logic circuitry can complete the data read transaction. For example, the logic circuitry can transfer a command to the I/O device to inform the I/O device that the data read request has been fulfilled and the data will be transferred via a deterministic interface to fulfill the data read request.

At block 451, the hypervisor can update the I/O device (e.g., mapping tables 214/314 illustrated in FIGS. 2 and 3, herein) to direct an I/O device address to the non-persistent memory device. For example, since the data was transferred from the persistent memory device to a non-persistent memory device (e.g., a non-persistent memory device and/or an intermediate memory component) at block 450, the hypervisor can update the mapping tables of the I/O device such that an address corresponding to the data requested maps to the non-persistent memory device. In some embodiments, the address can be a physical address such as virtual machine physical address.

At block 452, the hypervisor can record which memory was used to satisfy the data request. For example, the hypervisor can record that the data had been stored in the persistent memory device at the time the data request was received from the I/O device. In some embodiments, the hypervisor can use the information over time to selectively direct data writes to the persistent memory device or the non-persistent memory device.

Figure 5:
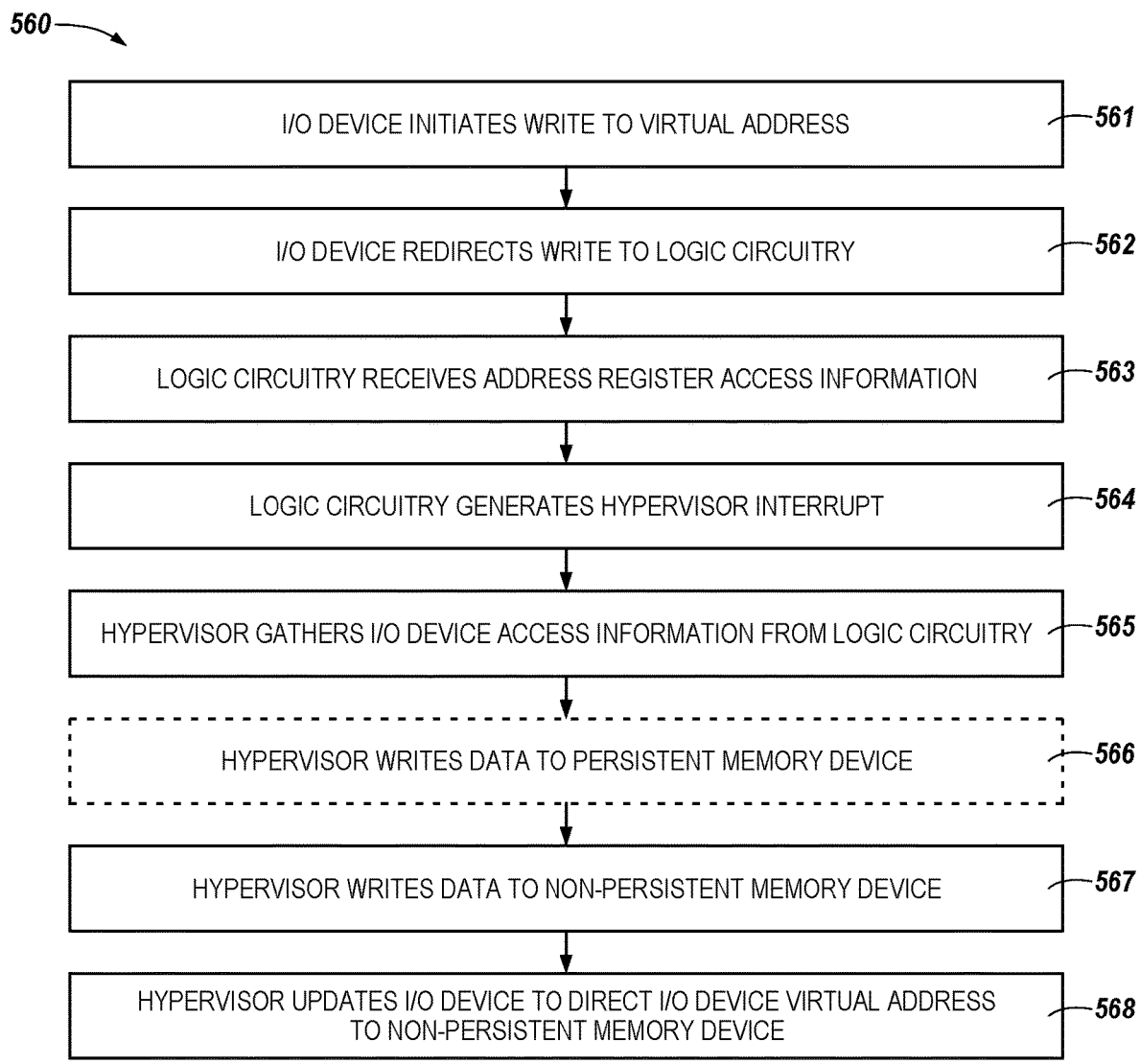
FIG. 5 is a flow diagram representing a data write operation in accordance with a number of embodiments of the present disclosure.

FIG. 5 is a flow diagram 560 representing a data write operation in accordance with a number of embodiments of the present disclosure. At block 561, an I/O device, such as the I/O device 210/310 illustrated in FIGS. 2 and 3 can initiate a write operation using an address received along with a data write request. The address can be a physical address, such as a virtual-machine physical address. The received address (e.g., physical address) can correspond to a location in a persistent memory device (e.g., the persistent memory device 216/316 illustrated in FIGS. 2 and 3, herein) or a location in a non-persistent memory device (e.g., the non-persistent memory device 230/330 illustrated in FIGS. 2 and 3, herein). As described herein, information with regards to whether the received address corresponds to a location in the persistent memory device or in the non-persistent memory device can be stored in a number of mapping tables (e.g., mapping tables 214/314 illustrated in FIGS. 2 and 3, herein) of the I/O device.

If the data is to be stored in the non-persistent memory device, the data may be written to the non-persistent memory device and the data write request can be fulfilled. However, if the data is to be stored in the persistent memory device, at block 562, the I/O device can redirect the data write request to logic circuitry (e.g., the logic circuitry 104/204/304 illustrated in FIGS. 1-3, herein). As described above, the data request can be redirected based on information (e.g., a command or instructions executed) provided by a hypervisor (e.g., the hypervisor 312 illustrated in FIG. 3, herein) that can be used to determine whether the received address is to be mapped to the location in the non-persistent memory device or in the persistent memory device.

At block 563, the logic circuitry can receive address register access information corresponding to the data write request. In some embodiments, the address register access information can correspond to a location in an address register (e.g., the address registers 106/206/306 illustrated in FIGS. 1-3, herein). For example, the address register access information can correspond to a location in an address register in the logic circuitry in which a logical address corresponding to a physical address in the persistent memory device in which the data is to be stored.

The logic circuitry can, at block 564, generate a hypervisor interrupt. For example, as described above in connection with FIG. 3, once the logic circuitry has received the redirected data write request from the I/O device, the logic circuitry can generate an interrupt and assert the interrupt on a hypervisor (e.g., the hypervisor 312 illustrated in FIG. 3, herein).

At block 565, the hypervisor can gather the address register access information from the logic circuitry. For example, the hypervisor can receive logical address information from the logic circuitry that corresponds to a physical address in which the data is to be stored.

At block 566, the hypervisor can optionally write the data (or cause the data to be written) to the persistent memory device. For example, based on the redirected data write request, the hypervisor can determine that the data is to be written to the persistent memory device and cause the data to be written to the persistent memory device. In embodiments in which block 566 is optionally performed, the data can be intermediately written to the non-persistent memory device. In addition, I/O device data corresponding to the data can be optionally written to the non-persistent memory device as part of writing the data to the non-persistent memory device.

Optionally, at block 567, the hypervisor can write the data (or cause the data to be written) to the non-persistent memory device. In some embodiments, the hypervisor can write the data to the non-persistent memory device such that the data can be retrieved via a deterministic interface or bus in the event a read request corresponding the data is received.

At block 568, the hypervisor can update the I/O device (e.g., mapping tables 214/314 illustrated in FIGS. 2 and 3, herein) to direct I/O device virtual addresses to the non-persistent memory device. For example, if the data is written to the non-persistent memory device at block 567, the hypervisor can, at block 568, update the mapping tables of the I/O device such that the virtual addresses associated with the data written to the non-persistent memory device are mapped to respective physical addresses in the non-persistent memory device. Accordingly, when the I/O device subsequently receives a request to access the same data that was previously stored in the non-persistent memory device, the I/O device can determine, based on information stored in the mapping tables, that the data are stored in the non-persistent memory device and redirect the request to access the data to the non-persistent memory device.

Figure 6:
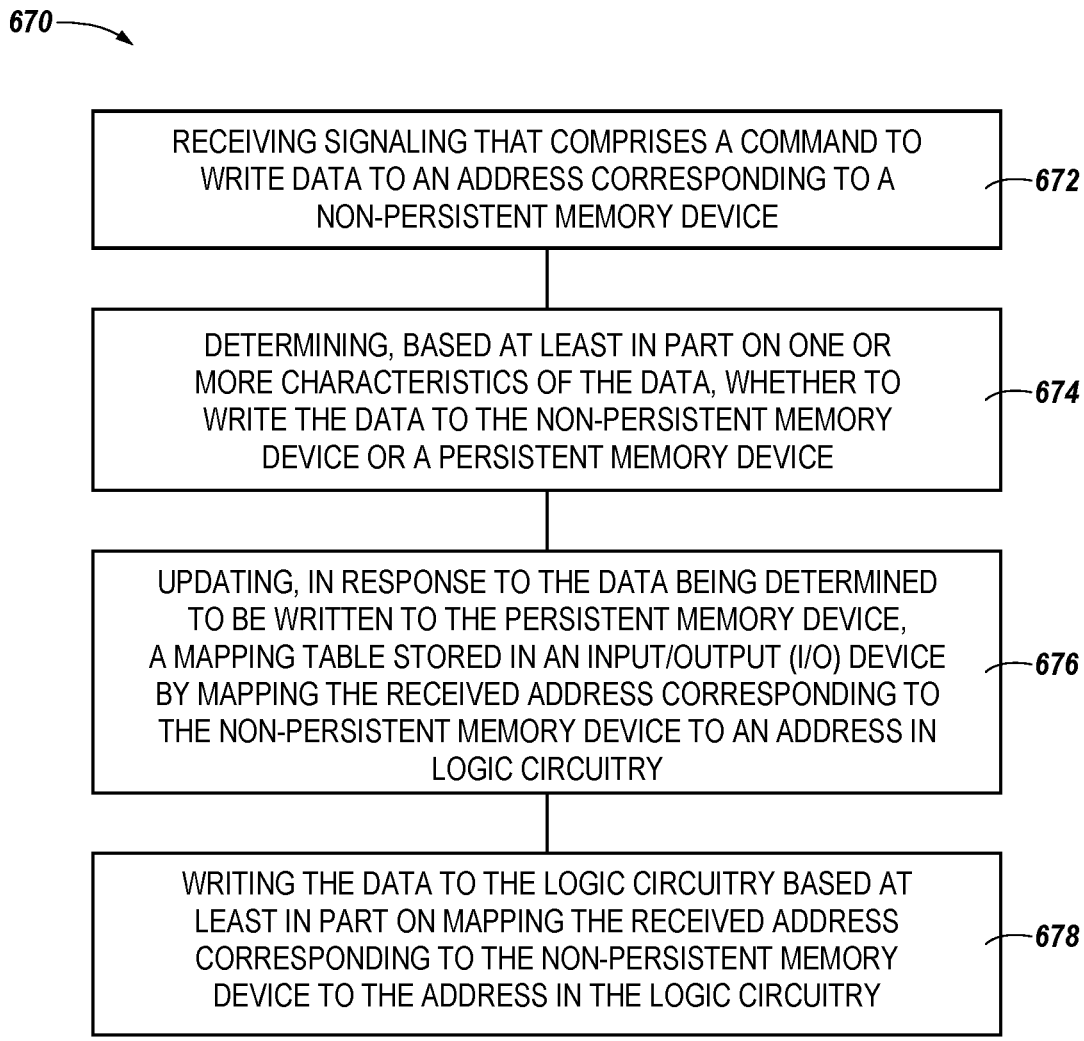
FIG. 6 is a flow diagram representing an example method for a hierarchical memory system in accordance with a number of embodiments of the present disclosure.

FIG. 6 is a flow diagram representing an example method 670 for a hierarchical memory system in accordance with a number of embodiments of the present disclosure. At block 672, the method 670 can include receiving signaling that includes a command to write data corresponding to a non-persistent memory device (e.g., the non-persistent memory device 230/330 as illustrated in FIGS. 2 and 3, herein). At block 674, the method 670 can include determining, based at least in part on one or more characteristics of the data, whether to write the data to the non-persistent memory device or a persistent memory device (e.g., the persistent memory device 216/316 as illustrated in FIGS. 2 and 3, herein).

At block 676, the method 670 can include updating, in response to the data being determined to be written to the persistent memory device, a mapping table (e.g., the mapping tables 214/314 as illustrated in FIGS. 2 and 3, herein) stored in an input/output (I/O) device by mapping the received address corresponding to the non-persistent memory device to an address in logic circuitry (e.g., the logic circuitry 204/304 as illustrated in FIGS. 2 and 3, herein). At block 678, the method 670 can include writing the data to the logic circuitry based at least in part on mapping the address corresponding to the non-persistent memory device to the address in the logic circuitry.

In some embodiments, the method 670 can further include determining (based at least in part on the characteristics of the data) that the data is to be written to the non-persistent memory device and updating the mapping table stored in the I/O device by mapping the received address to a physical address in the non-persistent memory device. In response to mapping the received address to the physical address in the non-persistent memory device, the method 670 can further include writing the data to the non-persistent memory device. In this example, the data can be transferred to the non-persistent memory device via an interface (e.g., the interface 208/308 as illustrated in FIGS. 2 and 3, herein) to which the non-persistent memory device and the I/O device are coupled.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
an input/output (I/O) device coupled to logic circuitry and a first memory device, wherein the I/O device is configured to:
map, in response to receipt of a command to write data to an address corresponding to the first memory device, the address of the received command to an address in the logic circuitry or a physical address in the first memory device based at least in part on one or more characteristics of the data; and
redirect, to write the data in a second memory device and via a peripheral component interconnect express (PCIe) interface, the command to the logic circuitry where information corresponding to one or more physical addresses of the second memory device is stored to cause the logic circuitry to assert an interrupt signal as part of the redirected command to a hypervisor only in response to the received address being mapped to the address in the logic circuitry.

2. The system of claim 1, wherein the I/O device is configured to:
determine, based at least in part on the one or more characteristics of the data, that the data is to be written to the first memory device; and
map the received address to a physical address in the first memory device; and
write, in response to the received address being mapped to the physical address in the first memory device, the data to the first memory device.

3. The system of claim 2, wherein the I/O device is configured to write the data to the first memory device without transferring the data to the logic circuitry.

4. The system of claim 1, wherein the logic circuitry comprises a mapping table that further comprises:
first addresses mapped to respective physical addresses in the second memory device; and
second addresses mapped to respective addresses in the logic circuitry.

5. The system of claim 4, wherein the first addresses and the second addresses are respective virtual machine physical addresses.

6. The system of claim 4, wherein the I/O device is configured to:
determine that the received address is one of the second addresses;
redirect the command to the first memory device; and
receive, in response to redirecting the command to the first memory device, the data from the first memory device.

7. The system of claim 1, wherein the logic circuitry is configured to associate information with the data that indicates that the data is inaccessible by the first memory device in response to the received address being mapped to the address in the logic circuitry.

8. The system of claim 1, wherein the logic circuitry comprises a buffer configured to store the data to be written to the second memory device or transferred to the I/O device.

9. A system, comprising:
an input/output (I/O) device coupled to logic circuitry that is coupled to a first memory device and a second memory device;
wherein the I/O device is configured to, in response to receipt of signaling comprising a command to access data from the first memory device:
determine, based on entries in the mapping table, that an address of the command corresponds to a respective address in the logic circuitry; and
redirect, to cause the logic circuitry to access the data from the second memory device and via a peripheral component interconnect express (PCIe) interface, the command to the logic circuitry where information corresponding to one or more physical addresses of the second memory device is stored and based on the determination that the address of the command corresponds to the respective address in the logic circuitry.

10. The system of claim 9, wherein the logic circuitry is configured to, in response to the command being redirected from the I/O device to the logic circuitry:
transfer the command to a hypervisor communicatively coupled to the logic circuitry via an interface to which the logic circuitry is coupled to the first memory device and the second memory device; and assert an interrupt signal to the hypervisor communicatively as part of the transferred command.

11. The system of claim 9, wherein the second memory device is configured to operate according to a PCIe.

12. The system of claim 9, wherein the first memory device is a non-persistent memory device comprising dynamic random access memory (DRAM) cells.

13. The system of claim 9, wherein the second memory device is a persistent memory device comprising an array of resistive memory cells, a phase change memory device, an array of self-selecting memory cells, or combinations thereof.

14. The system of claim 9, wherein the logic circuitry further comprises an address register storing logical addresses corresponding to addresses that are bypassed by direct memory access (DMA) components associated with the logic circuitry.

15. The system of claim 14, wherein the address register is a base address register.

16. A method, comprising:
responsive to receiving signaling comprising a command to access data from a first memory device, determining, by an input/output (I/O) device, that an address of the command corresponds to a respective address in the logic circuitry;
redirecting, to cause the logic circuitry to access the data from a second memory device and via a peripheral component interconnect express (PCIe) interface, the command to the logic circuitry where information corresponding to one or more physical addresses of the second memory device is stored and based on the determination that the address of the command corresponds to the respective address in the logic; and
prior to transferring the data to the I/O device, transferring the data accessed from the second memory device to the first memory device such that the data is accessed by the I/O device from the first memory device.

17. The method of claim 16, further comprising:
receiving signaling comprising a command to write the data to a first address corresponding to the first memory device;
determining whether to write the data to the first memory device or the second memory device based at least in part on one or more characteristics of the data;
updating, in response to the data being determined to be written to the second memory device, a mapping table stored in the I/O device by mapping the first address corresponding to the first memory device to an address in the logic circuitry; and
writing the data to the logic circuitry based at least in part on mapping of the first address corresponding to the first memory device to the address in the logic circuitry.

18. The method of claim 16, further comprising:
receiving signaling comprising a command to write the data to a first address corresponding to the first memory device;
determining, based at least in part on the one or more characteristics of the data, that the data is to be written to the first memory device; and
updating the mapping table stored in the I/O device by mapping the first address to a physical address in the first memory device; and
writing, in response to mapping the first address to the physical address in the first memory device, the data to the first memory device.

19. The method of claim 16, further comprising indicating, by the second memory device, that the data is inaccessible to the first memory device based on receipt of the redirected command to access the data from the first memory device.

* * * * *